United States Patent
Whinnery

(10) Patent No.: US 10,249,088 B2
(45) Date of Patent: Apr. 2, 2019

(54) SYSTEM AND METHOD FOR REMOTE VIRTUAL REALITY CONTROL OF MOVABLE VEHICLE PARTITIONS

(71) Applicant: Honda Motor Co., Ltd., Tokyo (JP)

(72) Inventor: Joseph Whinnery, Scotts Valley, CA (US)

(73) Assignee: Honda Motor Co., Ltd., Tokyo (JP)

( * ) Notice: Subject to any disclaimer, the term of this patent is extended or adjusted under 35 U.S.C. 154(b) by 199 days.

(21) Appl. No.: 14/548,596

(22) Filed: Nov. 20, 2014

(65) Prior Publication Data
US 2016/0147233 A1 May 26, 2016

(51) Int. Cl.
| | |
|---|---|
| *B60K 37/06* | (2006.01) |
| *B60K 35/00* | (2006.01) |
| *G06F 3/0488* | (2013.01) |
| *G02B 27/01* | (2006.01) |
| *G06F 3/0481* | (2013.01) |
| *G06T 19/00* | (2011.01) |
| *G06F 3/01* | (2006.01) |

(52) U.S. Cl.
CPC ............ *G06T 19/006* (2013.01); *B60K 35/00* (2013.01); *B60K 37/06* (2013.01); *G02B 27/017* (2013.01); *G06F 3/017* (2013.01); *G06F 3/04815* (2013.01); *G06F 3/04886* (2013.01); *B60K 2350/1052* (2013.01); *B60K 2350/2013* (2013.01); *B60K 2350/355* (2013.01)

(58) Field of Classification Search
CPC ....................................................... G06F 3/011
USPC ........................................................... 701/2
See application file for complete search history.

(56) References Cited

U.S. PATENT DOCUMENTS

| | | | |
|---|---|---|---|
| 6,178,358 B1 * | 1/2001 | Colarelli | G01B 21/26 700/16 |
| 8,332,093 B2 | 12/2012 | Yamasaki et al. | |
| 8,761,962 B2 | 6/2014 | Seok | |
| 2003/0058086 A1 * | 3/2003 | Hara | B60R 25/245 340/425.5 |
| 2006/0226298 A1 * | 10/2006 | Pierson | A63H 30/04 246/1 R |

(Continued)

FOREIGN PATENT DOCUMENTS

EP          1462762 B1 *  11/2010  ............... B60R 1/00

OTHER PUBLICATIONS

ZF—Bosch Smart Trailer Parking System (demonstration) (Year: 2013).*

(Continued)

*Primary Examiner* — Charles J Han
(74) *Attorney, Agent, or Firm* — Rankin, Hill & Clark LLP

(57) ABSTRACT

A method for remote virtual reality control of movable vehicle partitions includes displaying a graphic model of at least a portion of a vehicle on an output device. The output device is located remotely from the vehicle and the vehicle has one or more movable vehicle partitions. The method includes processing images received from one or more imaging devices, the images including gestures relative to the graphic model. The method includes identifying one or more vehicle commands based on the gestures relative to the graphic model. The vehicle commands define control of the one or more movable vehicle partitions. The method further includes executing the vehicle commands at the vehicle.

12 Claims, 8 Drawing Sheets

(56) References Cited

U.S. PATENT DOCUMENTS

| | | | |
|---|---|---|---|
| 2006/0255909 A1* | 11/2006 | Pavatich | B60R 25/24 340/5.64 |
| 2011/0282537 A1* | 11/2011 | Yamasaki | G06F 3/017 701/31.4 |
| 2012/0320034 A1 | 12/2012 | Baron et al. | |
| 2013/0050069 A1* | 2/2013 | Ota | G06F 3/011 345/156 |
| 2013/0278631 A1* | 10/2013 | Border | G02B 27/017 345/633 |
| 2015/0081169 A1* | 3/2015 | Pisz | B60H 1/00657 701/36 |

OTHER PUBLICATIONS

ZF—Bosch Smart Trailer Parking System (press release) (Year: 2013).*
ZF—Bosch Smart Trailer Parking System (GMC blog) (Year: 2014).*
ZF—Bosch Smart Trailer Parking System (Car and Driver article) (Year: 2014).*
Karam, M. A Taxonomy of Gestures in Human Computer Interaction (2005) (Year: 2005).*

* cited by examiner

SYSTEM AND METHOD FOR REMOTE VIRTUAL REALITY CONTROL OF MOVABLE VEHICLE PARTITIONS

BACKGROUND

Remote control of vehicles allows a user to control parts and functions of the vehicle in an area located away from the vehicle and without physical interaction between the user and the vehicle. Remote control of movable partitions (e.g., vehicle doors, windows, sunroof, trunk) of a vehicle presents some challenges since the user, located remotely from the vehicle, may not be aware of unfavorable conditions and safety hazards related to controlling (e.g., opening, closing) the movable partitions. As such, Federal Motor Vehicle Safety Standards include strict regulations for remote control of movable partitions to minimize the likelihood of death or injury from accidental operation of movable partitions. Remote control of vehicles, and particularly of movable vehicle partitions, can be facilitated using virtual reality techniques.

BRIEF DESCRIPTION

According to one aspect, a computer-implemented method for remote virtual reality control of movable vehicle partitions includes displaying a graphic model of at least a portion of a vehicle on an output device. The output device is located remotely from the vehicle and the vehicle has one or more movable vehicle partitions. The method includes processing images received from one or more imaging devices, the images including gestures relative to the graphic model. The method includes identifying one or more vehicle commands based on the gestures relative to the graphic model. The vehicle commands define control of the one or more movable vehicle partitions. The method further includes executing the vehicle commands at the vehicle.

According to another aspect, a system for remote virtual reality control of movable vehicle partitions includes a vehicle having a controller and one or more movable vehicle partitions, the controller operably connected for computer communication to an output device. The output device is located remotely from the vehicle and has a display. The output device displays a graphic model of at least a portion of the vehicle on the display. The output device includes a processor and the processor includes a gesture module. The gesture module processes images received from one or more imaging devices, the images including gestures relative to the graphic model. The processor includes a vehicle command module. The vehicle command module identifies one or more vehicle commands based on the gestures relative to the graphic model, the vehicle commands define control of the one or more movable vehicle partitions. The vehicle command module transmits the one or more vehicle commands to the controller for execution at the vehicle.

According to a further aspect, a non-transitory computer-readable storage medium storing instructions that, when executed by a computer, causes the computer to perform a method. The method includes displaying a graphic model of at least a portion of a vehicle on an output device. The output device is located remotely from the vehicle, and the vehicle has one or more movable vehicle partitions. The method includes processing images received from one or more imaging devices, the images including gestures relative to the graphic model. The method includes identifying one or more vehicle commands based on the gestures relative to the graphic model. The vehicle commands define control of the one or more movable vehicle partitions. The method includes transmitting the vehicle commands to the vehicle for execution.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
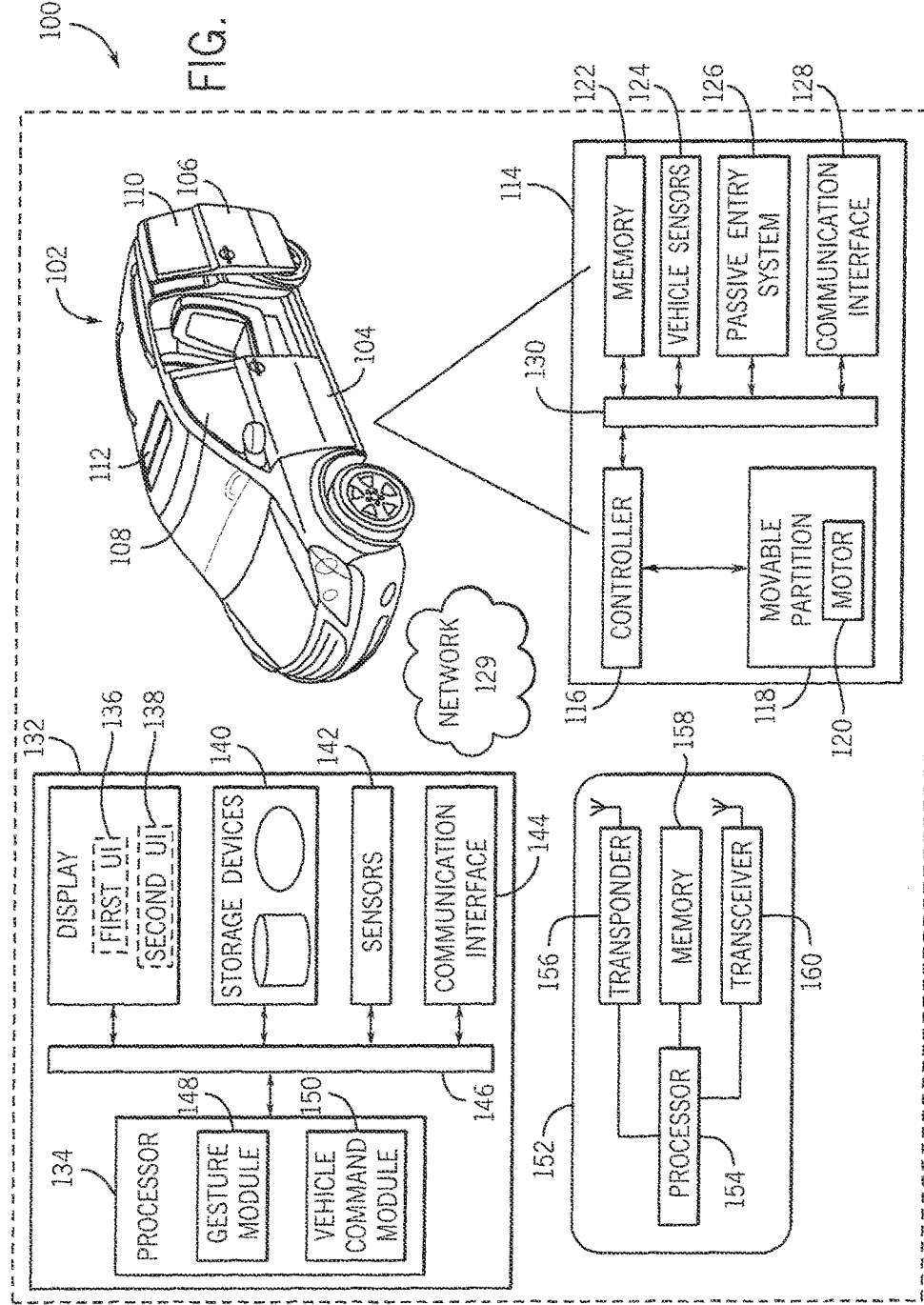
FIG. 1 is a schematic diagram of an operating environment for implementing systems and methods for remote virtual reality control of movable vehicle partitions according to an exemplary embodiment.

The following includes definitions of selected terms employed herein. The definitions include various examples and/or forms of components that fall within the scope of a term and that can be used for implementation. The examples are not intended to be limiting.

A "bus," as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk," as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "database," as used herein can refer to table, a set of tables, a set of data stores and/or methods for accessing and/or manipulating those data stores. Some databases can be incorporated with a disk as defined above.

A "memory," as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection," or a connection by which entities are "operably connected," is one in which signals, physical communications, and/or logical communications can be sent and/or received. An operable connection can include a wireless interface, a physical interface, a data interface, and/or an electrical interface.

A "processor," as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "portable device," as used herein, is a computing device typically having a display screen with user input (e.g., touch, keyboard) and a processor for computing. Portable devices include, but are not limited to, handheld devices, mobile devices, smart phones, laptops, tablets, and e-readers. In some embodiments, a "portable device" could refer to a remote device that includes a processor for computing and/or a communication interface for receiving and transmitting data remotely.

A "vehicle," as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle may or may not carry one or more human occupants. Further, the term "vehicle" can include vehicles that are automated or non-automated with pre-determined paths or free-moving vehicles.

A "vehicle system," as used herein can include, but is not limited to, any automatic or manual systems that can be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

A "vehicle occupant," as used herein can include, but is not limited to, one or more biological beings located in the vehicle. The vehicle occupant can be a driver or a passenger of the vehicle. The vehicle occupant can be a human (e.g., an adult, a child, an infant) or an animal (e.g., a pet, a dog, a cat).

A "wearable computing device," as used herein can include, but is not limited to, a computing device component (e.g., a processor) with circuitry that can be worn or attached to user. In other words, a wearable computing device is a computer that is subsumed into the personal space of a user. Wearable computing devices can include a display and can include various sensors for sensing and determining various parameters of a user. For example, location, motion, and physiological parameters, among others. Some wearable computing devices have user input and output functionality. Exemplary wearable computing devices can include, but are not limited to, watches, glasses, clothing, gloves, hats, shirts, jewelry, rings, earrings necklaces, leashes, collars, armbands, shoes, earbuds, headphones, personal wellness devices, and medical implant devices.

Generally, the systems and methods disclosed herein are directed to remote vehicle control of movable vehicle partitions using virtual reality. Virtual reality provides attended control of movable vehicle partitions in a fully automatic and unattended manner. Referring now to the drawings, wherein the showings are for purposes of illustrating one or more exemplary embodiments and not for purposes of limiting same. FIG. 1 is a schematic diagram of an operating environment 100 for implementing systems and methods for remote virtual reality control of movable vehicle partitions according to an exemplary embodiment. The components of environment 100, as well as the components of other systems, hardware architectures, and software architectures discussed herein, can be combined, omitted, or organized into different architectures for various embodiments. In the illustrated embodiment of FIG. 1, the environment 100 includes a vehicle 102 with movable partitions. The movable partitions of the vehicle 102 are illustrated in FIG. 1 as a front vehicle door 104, a rear vehicle door 106, a front vehicle door window 108, a rear vehicle door window 110, and a sunroof 112. The vehicle 102 can include other movable partitions, for example, doors and windows on a passenger side of the vehicle, a trunk, among others.

The vehicle 102 and/or each movable partition described above can include a computing device 114. The computing device 114 can be, for example, an electronic control unit of the vehicle 102 and/or an electronic control unit associated with each of the movable partitions. The computing device 114 can include a controller 118 with a processor (not shown). The movable partitions described above are shown schematically as part of the computing device 114 as movable partition 118. Each movable partition 118 can have a motor 120 for mechanically and electrically controlling the movable partition 118. Alternatively, the controller 118 of the computing device 114 can control (e.g., via the processor (not shown)) the movable partition 118.

The vehicle 102 can also include a memory 122, vehicle sensors 124, a passive entry system 126 and a communication interface 128, which are each operably connected for computer communication via a bus 130 and/or other wired and wireless technologies. The communication interface 128 provides software and hardware to facilitate data input and output between the components of the computing device 114 and other components, networks, and data sources of the environment 100. It is understood that the network 129 is, for example, a data network, the Internet, a wide area network or a local area network. The network 129 can serve as a communication medium between the components of the environment 100 as well as to various remote devices (e.g., databases, web servers, remote servers, application servers, intermediary servers, client machines, other portable devices) via the network 129.

The vehicle sensors 124 can be associated with the vehicle 102, each movable partition 118, and/or other vehicle systems of the vehicle (not shown). It is understood that vehicle sensors 124 can be any type of sensor, for example, acoustic, electric, environmental, optical, imaging, light, pressure, force, thermal, temperature, proximity, among others. The vehicle sensors 124 are generally operable to sense a measurement of data associated with the vehicle 102 (e.g., the interior and exterior environment of the vehicle 102), the movable partition 118 and/or a vehicle system of the vehicle 102. The vehicle sensors 124 can generate a data signal indicating the measurement of data. These data signals can be converted into other data formats (e.g., numerical) and/or used by the controller 116 and/or the movable partition 118 to generate other data metrics and parameters.

Figure 2:
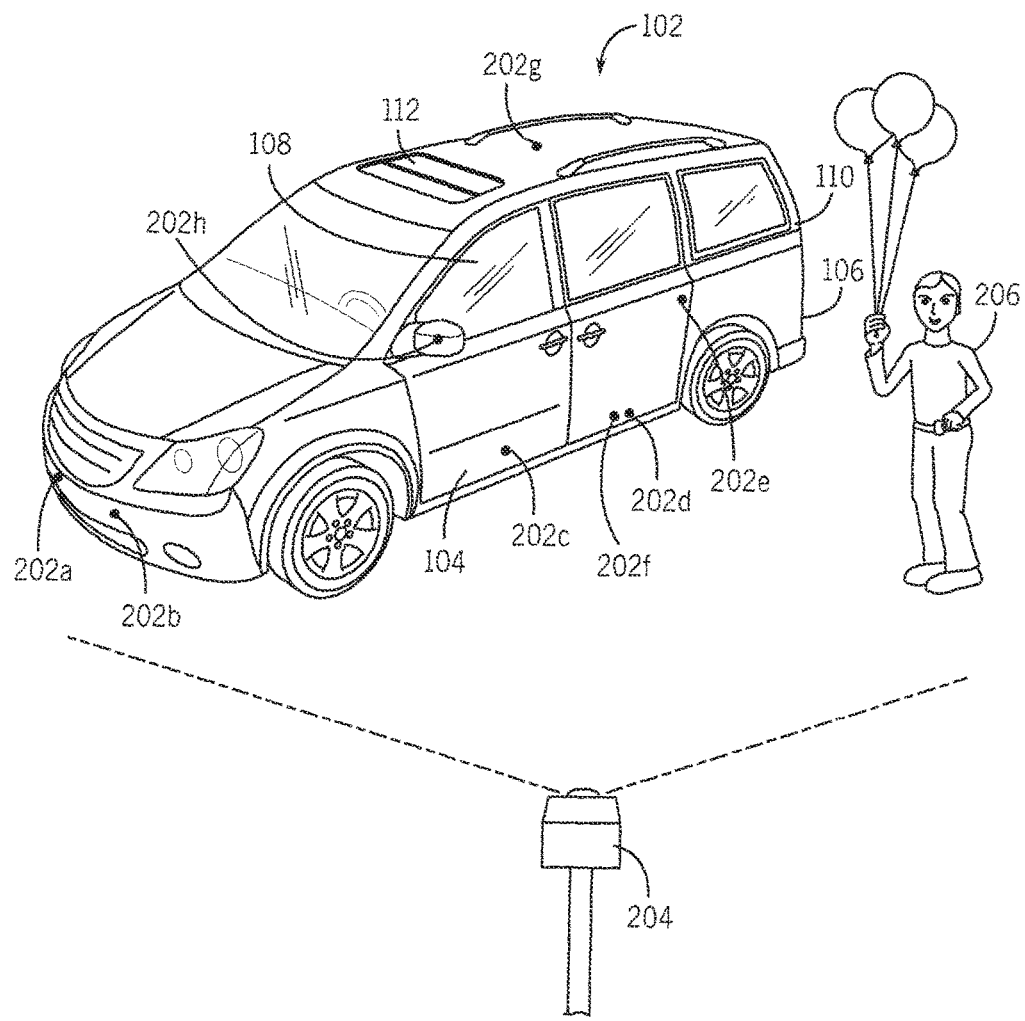
FIG. 2 is a detailed schematic view of the vehicle of FIG. 1 located remotely from the output device of FIG. 1, the vehicle implementing systems and methods for remote virtual reality control of movable vehicle partitions according to an exemplary embodiment.

In one embodiment, the vehicle sensors 124 provide data to generate a real-time virtual reality model of the vehicle. For example, FIG. 2 illustrates the vehicle 102 of FIG. 1 including the front vehicle door 104, the rear vehicle door 106, the front vehicle door window 108, the rear vehicle door window 110, and the sunroof 112 (e.g., the movable partitions 118). As shown in FIG. 2, vehicle sensors 124 can include sensors 202, which provide information about the vehicle 102, movable partitions and the environment around the vehicle 102 (e.g., objects, obstacles, pedestrians, weather conditions). More specifically, the sensors 202 are a wireless network of sensors that provide real-time data on the environment of the vehicle 102 and the movable partitions 118. In FIG. 2, the sensors 202a and 202b are located on the front bumper of the vehicle 102. In one embodiment, the sensors 202a and 202b are proximity sensors to detect the proximity and presence of objects around the vehicle 102. The sensor 202c is located on the front vehicle door 104. The sensor 202c can also be a proximity sensor and/or can provide information on the position of the front vehicle door 1004 (e.g., open, closed).

In FIG. 2, the sensor 202d is located along a running footboard of the vehicle 102 and the sensor 202e is located along the interior of a pillar near the rear vehicle door 106. The sensors 202d and 202e, in one embodiment, are optical sensors for monitoring the position of the rear vehicle door 106 and an area around the rear vehicle door 106. The sensor 202f is located on the rear vehicle door 160. Sensor 202f can also be a proximity sensor and/or can provide information on the position of the rear vehicle door 106 (e.g., open, closed). The sensor 202g is located on the top of the vehicle 102. In one embodiment, sensor 202g could be a sensor for detecting ambient conditions, for example, temperature, rain, snow, among others. Further, the sensor 202h is located on a front side mirror of the vehicle 102. The sensor 202h can be part of a blind spot monitoring system (not shown) of the vehicle 102 and can provide information on vehicles and obstacles near the vehicle 102. It is appreciated that the sensors 202 can be located in other positions in the vehicle 102 or on the vehicle 102. For example, sensors can be located on and/or within vehicle door side panels, the top or bottom of vehicle windows, or integrated into the partition drive mechanisms, among others.

Figure 3A:
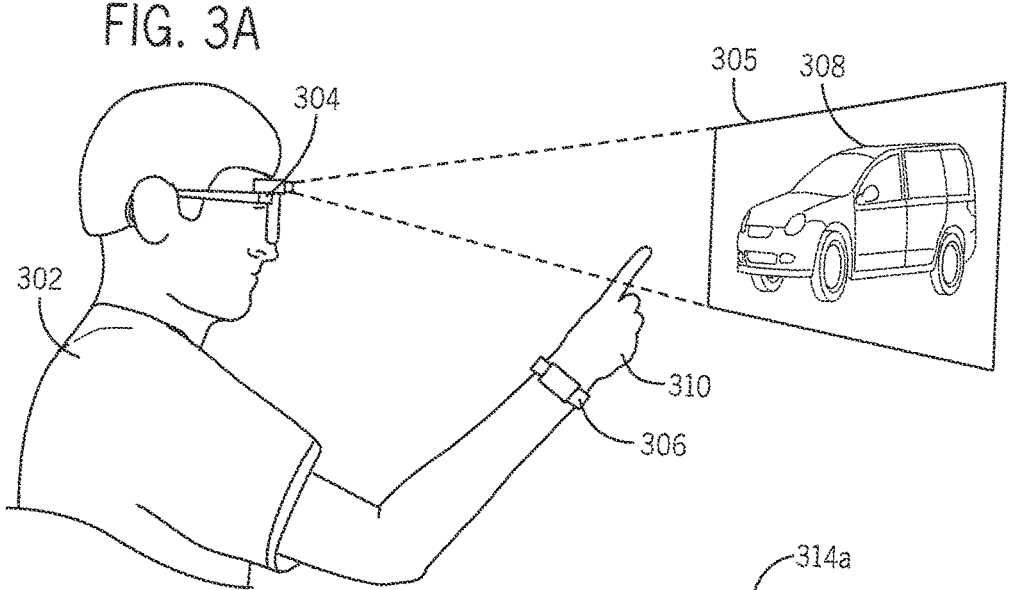
FIG. 3A is a schematic view of a user and an output device (i.e., a headset, a wearable computing device) implementing systems and methods for remote virtual reality control of movable vehicle partitions according to an exemplary embodiment.
Figure 3B:
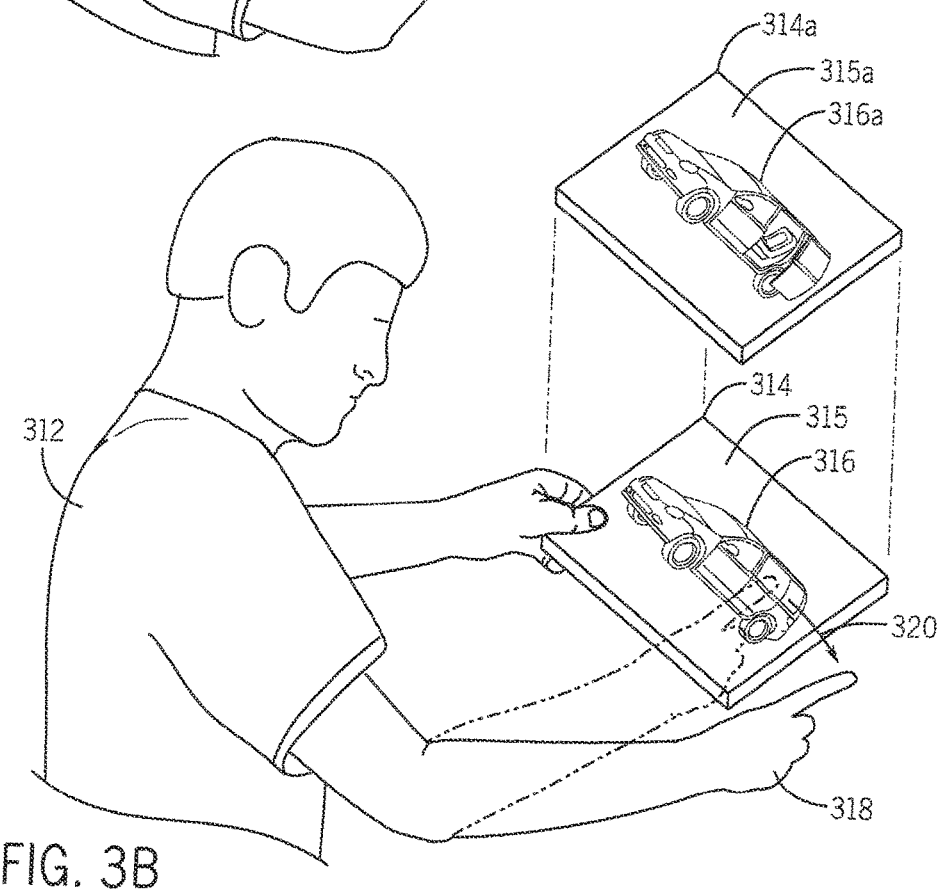
FIG. 3B is another schematic view of a user and an output device (i.e., a portable device) implementing systems and methods for remote virtual reality control of movable vehicle partitions according to an exemplary embodiment.

As discussed above, the vehicle 102 includes a controller 116 and one or more movable partitions 113. The controller 116 is operably connected for computer communication to an output device 132. As will be discussed in further detail herein, this connection can be facilitated by the communication interface 128 of the vehicle 102 and a communication interface 148 of the output device 132, via for example, the network 129. Generally, the output device 132 is a computing device for implementing remote virtual reality control of movable vehicle partitions 118 of the vehicle 102. The output device 132 can be a portable device, a head-mounted display, and/or a wearable computing device. For example, FIG. 3A illustrates a user 302 in possession of an output device 304, specifically, a head-mounted display 304. FIG. 3A also illustrates a wearable computing device 306 that in sonme embodiments, can be used as an output device alone or in conjunction with the output device 304. In FIG. 3B, a user 312 is in possession of an output device 314, specifically, a tablet 314.

Referring again to FIG. 1, the output device 132 includes a processor 134, and a display 135, including a first user interface 136 and a second user interface. The display 135, in some embodiments, can include one user interface or more than two user interfaces. The user interfaces allow a user to interact (e.g., touch input, keyboard input, gesture input) with the output device 132 via the display 135. As will be discussed in further detail herein, the display 132 provides a graphic model of the vehicle 102 for remote virtual reality control of movable partitions 118 of the vehicle 102.

The output device 132 also includes storage devices 140 (e.g., a memory, a disk), sensors 142 and a communication interface 144. Each component of the output device 132 is operably connected for computer communication via a bus 146 and/or other wired and wireless technologies. Additionally, as will be described in further detail with the systems and the methods discussed herein, the processor 134 includes a gesture module 148 and a vehicle command module 150, each suitable for providing remote virtual control of movable vehicle partitions facilitated by the components of the environment 100.

The sensors 142 of the output device 132 can include position and motion sensors, for example, accelerometer, gyroscope, magnetometer, compass, location (GPS), and navigation sensors, barometer, temperature and air pressure sensors, audio sensors, imaging sensors, among others. It is understood that sensors 142 can be any type of sensor, for example, acoustic, electric, environmental, optical, imaging, light, pressure, force, thermal, temperature, proximity, among others. The sensors 142 are generally operable to sense a measurement of data associated with the output device 132. In particular, the data can be associated with the output device 132 itself and/or an external environment around the output device 132. The sensors 142 can generate a data signal indicating the measurement of data. These data signals can be converted into other data formats (e.g., numerical) and/or used by the processor 134 to generate other data metrics and parameters. For example, as will be described in more detail herein, imaging sensors (e.g., optical sensors) and/or touch sensors can be used to provide data on user gestures relative to a graphic model displayed on the output device 132.

As mentioned above, the output device 132 includes the communication interface 144, similar to the communication interface 128 of the vehicle 102. The output device 132 is operably connected for computer communication (e.g., via a bus 146 and/or the communication interface 144) to each of the components of the output device 132. The communication interface 144 can also provide communication capabilities between the output device 128 and other components of the environment 100, via, for example, the network 129.

In operation, the output device 132 is located remotely from the vehicle 102. As an illustrative example, and referring to FIGS. 2 and 3A, the user 302 in possession of the output device 304 can be located inside a restaurant, while the vehicle 102 (FIG. 2) is located in a parking lot, out of visual sight from the user 302. As discussed above, the output device 132 displays a graphic model of at least a portion of the vehicle 102 on the display 135. For example, as shown in FIG. 3A, a display 305 of the output device 304 displays a graphic model 308 of the vehicle 102 projected in front of the user 302 by the output device 304. In FIG. 3B, a graphic model 316 of the vehicle 102 is displayed on a display 315 of the output device 314.

Referring again to FIG. 1, in one embodiment, the gesture module 148 generates the graphic model of at least a portion of the vehicle 102 on the display 135. In one embodiment, the graphic model is a three-dimensional virtual reality model of the vehicle. For example, referring to FIG. 3A, the output device 304 (i.e., the head-mounted display) can project a three-dimensional virtual reality model 308 of the vehicle 102. Referring again to FIG. 1, the graphic model of at least a portion of the vehicle 102 can be stored at the output device 132 (e.g., the storage devices 140) and/or remotely at the network 129. In one embodiment, the output device 132 can store more than one graphic model of a vehicle. For example, the output device 132 includes storage devices 140, which can include a database of one or more graphic models, each graphic model associated with a vehicle and a user. Thus, in one embodiment, the gesture module 148 can display a list of vehicles (e.g., from the storage devices 140) to a user on the display 135. The user can select a vehicle from the display 135 (e.g., via gestures and/or touch input with the user interfaces of the display 135) and the gesture module 148 can generate a graphic model of at least a portion of the vehicle selected by the user using stored data associated with the vehicle selected by the user from the storage devices 140.

By displaying a graphic model of at least a portion of the vehicle 102, a user can interact (e.g., via gestures and/or touch input) with the graphic model to manipulate movable partitions 118 of the vehicle 102. Specifically, the gesture module 148 can process images received from one or more imaging devices, the images including gestures relative to the graphic model. For example, in AG. 3A, the output device 304 can include imaging devices (e.g., optical sensors, cameras) to capture images of gestures in relation to the graphic model 308 displayed. For example, the user 302 moves his hand 310 in relation to the graphic model 308 thereby creating a gesture movement. The imaging devices of the output device 304 capture images of the user's hand 310 within the field of view of the imaging devices. The gesture module 148 receives the images and processes the images to determine X, Y and Z coordinates relative to the virtual environment (e.g., the graphic model 308). The gesture module 148 can determine the user's 302 interactions with the graphic model 308 based on the location of the user's hand 310 and the currently displayed graphic model 308. The user's interactions with the graphic model 308 can be based on X, Y and Z coordinates relative to the virtual environment (e.g., coordinates defining components of the graphic model 308). The gesture module 148 can also include gesture recognition capabilities to recognize gestures within the images received from the output device 304.

In FIG. 3B, the output device 314 can include imaging devices (e.g., optical sensors, cameras) to capture images of gestures in relation to the graphic model displayed. In another embodiment, the output device 314 can include touch sensors to capture touch input of gestures in relation to the graphic model displayed. As an illustrative example, in FIG. 3B, the user 312, moves his hand 318 in relation to the graphic model 316 thereby creating a swiping gesture in the direction of arrow 320. The gesture in relation to the graphic model 316 can be a hand gesture in front of the output device 314 or a touch gesture on the output device 314 (e.g., on a user interface of the output device 314). The imaging devices of the output device 314 capture images of the user's hand 318 within the field of view of the imaging devices. In the case of a touch gesture, imaging devices and/or touch sensors on the output device 314 can capture images and/or data of the users hand 318. The gesture module 148 receives said images and processes the images to determine X, Y and Z coordinates relative to the virtual environment (e.g., the graphic model 316). The gesture module 148 can determine the users 312 interactions with the graphic model 316 based on the location of the user's hand 318 and the currently displayed graphic model 316. The user's interactions with the graphic model 316 can be based on X, Y and Z coordinates relative to the virtual environment (e.g., coordinates defining components of the graphic model 316). It is understood that the gesture module 148 can also include gesture recognition capabilities to recognize gestures within the images received from the output device 314.

Referring again to FIG. 1, the gesture module 148 can update the graphic model on the display 135 based on the gestures relative to the graphic model. Accordingly, the user can manipulate the graphic model using gestures relative to the graphic model and the graphic model is updated in real-time on the display 135. As an illustrative example, in FIG. 3B, the user 312 moves his hand 318 in relation to the graphic model 316 thereby creating a swiping gesture in the direction of arrow 320. The output device 314a shows an updated display of the graphic model 316, shown as graphic model 316a, on the display 315a. The graphic model 316a displays an updated graphic model of the vehicle 102 with the rear vehicle door open based on the gesture made relative to the graphic model 316. It is understood that the gesture module 148 can update the graphic model on the display 135 based on the gestures relative to the graphic model upon processing the images received from the one or more imaging devices and/or upon identifying one or more vehicle commands (as discussed below).

Referring again to FIG. 1, in one embodiment, the gesture module 148 displays the graphic model on the first interface 136 of the display 135 and the gesture module 148 streams a real-time video feed of the vehicle 102 to the second interface 138 of the display 135. The video feed can be received from one or more imaging devices located near the vehicle. For example, the imaging devices can be operably connected for computer communication to the vehicle 102 and/or the output device 132 by a wireless communication technology facilitated, for example, by the network 129. The display 135 may have one user interface or multiple user interfaces. The graphic model and the real-time video feed can be displayed on different user interfaces or the same user interface. Further, in some embodiments, real-time audio can be received from imaging devices equipped with acoustic sensors and/or stand along acoustic sensors located around the vehicle. For example, a real-time audio feed can be received from one or more imaging devices located near the vehicle. The real-time audio, which corresponds to the real-time video feed, can be streamed by the gesture module 148 to the display 135 (e.g., the display 135 can include speakers and/or output devices that produce sound on the output device 132.

Figure 4A:
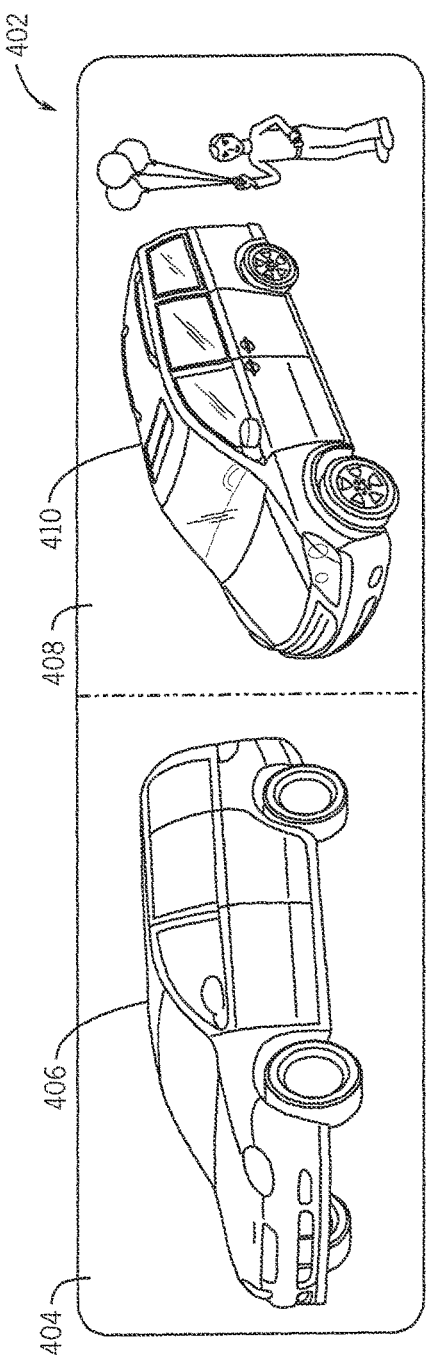
FIG. 4A is a schematic view of an output device including a first user interface displaying a three-dimensional model of a vehicle and a second user interface displaying a real-time video feed of the vehicle according to an exemplary embodiment.

Referring now to FIG. 4A and with reference to FIG. 1, an exemplary display 402 (e.g., the display 135) of the output device 132 is illustrated according to one embodiment. The embodiment shown in FIG. 4A can be implemented with the output devices 304 and 314 of FIGS. 3A and 3B. Said differently, the output devices 304 and 314 of FIGS. 3A and 3B can include more than one user interface and can display a graphic model of a vehicle and a real-time video feed of the vehicle as will be described herein.

The display 402 includes a first user interface 404 that displays a graphic model 406 of the vehicle 102. The display 402 also includes a second user interface 408 that displays a real-time video feed 410 of the vehicle 102. The real-time video feed 410 of the vehicle 102 can be received from imaging devices located near the vehicle 102. For example, as shown in FIG. 2, an imaging device 204 is shown that can provide images and/or live video of the vehicle 102 located remotely from the output device 132. The images and/or the live video of the vehicle 102 from the imaging device 204 provides real-time monitoring of the vehicle 102 and the environment surrounding the vehicle 102. For example, in FIG. 2, a person 206 is located near the vehicle. Accordingly, the real-time video feed 410 shown in FIG. 4A displays the vehicle and the person. Thus, the real-time video feed 410 provides a visual view of the vehicle 102, including obstacles, pedestrians, weather conditions, to the output device 132 located remotely from the vehicle 102. This allows a user to view a graphic model of the vehicle 102 and a real-time video feed of the vehicle 102 while being located remotely and out of sight from the vehicle 102.

Further, as mentioned above, the output device 132 can stream a real-time audio feed to the output device corresponding to the real-time video feed of the vehicle. For example, the real-time audio feed can be received simultaneously with the real-time video feed 410 received from imaging devices located near the vehicle 102. In other embodiments, the real-time audio feed can be received separately from a standalone audio and/or acoustic sensor located near the vehicle 102. Accordingly, the real-time video feed 410 shown in FIG. 4A along with a real-time audio feed can provide a visual view of the vehicle 102 as well as auditory information around the vehicle 102.

Referring again to FIG. 4A, a user can manipulate the graphic model 406 of the vehicle 102 shown in the first user interface 404 using gestures while viewing the real-time video feed 410 of the vehicle 102 shown at the second user interface 408. Accordingly, the user can manipulate the graphic model 406 with knowledge of obstacles, pedestrians and weather conditions displayed in the real-time video feed 410. This allows the user to make decisions on moving various movable partitions of the vehicle based on the real-time video feed. For example, a user viewing the display 402 may notice in the real-time video feed 410 that a pedestrian is approaching the vehicle. As another example, a user viewing the display 402 may hear from the real-time audio feed that a pedestrian is approaching the vehicle, although the real-time video feed 410 may not show the pedestrian near the vehicle 102. With this information, the user may choose not to open a window or a vehicle door of the vehicle 102 by manipulating the graphic model 406 since the pedestrian is located near the vehicle. Instead, the user may manipulate the graphic model 406 indicating an intent to open the sunroof.

In another embodiment, the gesture module 148 generates a real-time virtual reality model of the vehicle and displays the real-time virtual reality model of the vehicle on the second interface. As discussed above, the vehicle 102 can include sensors, for example, sensors 202 shown in FIG. 2. These sensors can act as tracking devices to provide information on the vehicle 102 and the environment of the vehicle 102. Further, other imaging devices, for example, the imaging device 204, can also provide information (e.g., visual data, audio data) on the vehicle 102 and the environment of the vehicle 102. Based on the information from the sensors 202 and/or the imaging device 204, the gesture module 148 can generate a real-time virtual reality model of the vehicle. In some embodiments, the gesture module 148 could also use the graphic model of the vehicle (e.g., stored at the storage devices 140) with the information from the sensors 202 and/or the imaging device 204 to generate a real-time virtual reality model of the vehicle. Thus, the graphic model of the vehicle can be augmented using the information from the sensors 202 and/or the imaging device 204 to generate a real-time virtual reality model of the vehicle. Further, in some embodiments, real-time audio data from sensors and/or imaging devices from around the vehicle can be streamed with the virtual reality model of the vehicle on the output device 132.

Figure 4B:
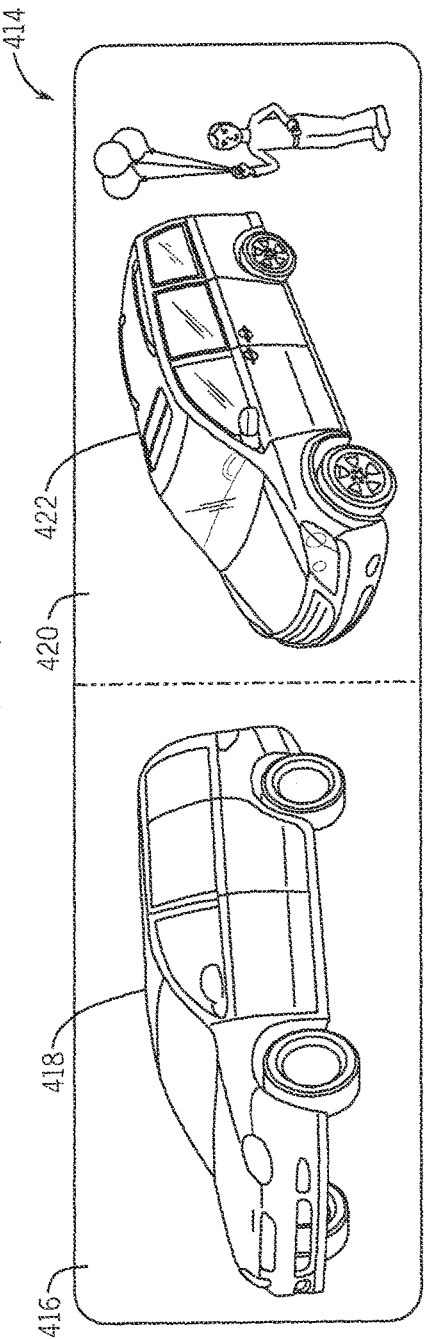
FIG. 4B is a schematic view of the output device of FIG. 4A where the second user interface displays a real-time virtual reality model of the vehicle according to an exemplary embodiment.

Referring now to FIG. 4B and with reference to FIG. 1, an exemplary display 414 (e.g. the display 135) of the output device 132 is illustrated according to one embodiment. As mentioned above with FIG. 4A, it is understood that the embodiment shown in FIG. 4B can be implemented with the output devices 304 and 314 of FIGS. 3A and 3B. Said differently, the output devices 304 and 314 of FIGS. 3A and 3B can include more than one user interface and can display a graphic model of a vehicle and a real-time video feed of the vehicle as will be described herein.

In the embodiment shown in FIG. 4B, a display 414 includes a first user interface 416 that displays a graphic model 418 of the vehicle 102. The display 414 also includes a second user interface 420 that displays a real-time virtual reality model 422 of the vehicle 102 and the surrounding environment. As discussed above, the output device 314 can also stream real-time audio corresponding to the real-time virtual reality model 422. A user can manipulate the graphic model of the vehicle 102 shown in the first user interface 416 using gestures while viewing the a real-time virtual reality model of the vehicle 102 shown at the second user interface 420. This allows the user to make decisions on opening/closing various movable partitions of the vehicle based on the real-time virtual reality model of the vehicle 102. Similar to FIG. 4A, the configuration of the display 414 of FIG. 4B allows a user to manipulate the graphic model 418 with knowledge of obstacles, pedestrians and weather conditions displayed in the real-time virtual reality model 422 of the vehicle 102 and the surrounding environment of the vehicle 102.

Referring back to FIG. 1, the vehicle command module 150 identifies one or more vehicle commands based on the gestures relative to the graphic model. The vehicle commands define control (e.g., a controlled change) of the one or more movable vehicle partitions. In one embodiment, a vehicle command includes a vehicle component and an action, for example, a vehicle component of a front vehicle door and an action of open. In some embodiments, the vehicle command can include other parameters related to the vehicle component and/or action. For example, the action of open could include a measurement of how far to open the front vehicle door. It is appreciated that other parameters can be included with the vehicle command to facilitate control of the movable partitions.

As mentioned above, the vehicle command module 150 identifies one or more vehicle commands based on the gestures relative to the graphic model. As an illustrative example, the vehicle command module 150 can use characteristics of the gesture, for example, a hand shape, a position of the hand (e.g., X, Y and Z coordinates relative to the graphic model), a movement and direction of movement of the hand relative to the graphic model, to identify the gesture and the component of the graphic model associated with the gesture (e.g., a movable partition). The vehicle command module 150 can, in one embodiment, query a database (e.g., the storage devices 140 and/or located at the network 129, the memory 122) with the characteristics described above and the identified component of the graphic model to determine an associated vehicle command in relation to the graphic model. For example, referring to FIG. 3B, the shape of the hand 318, the position of the hand 318 and the motion and direction 320 of the hand 318 with respect to coordinates of the graphic model 316 can be used to determine a vehicle command. In this example, the gesture indicates a sweeping motion across the rear vehicle door shown in the graphic model 316. Accordingly, the vehicle command module 150 identifies the vehicle command as opening the rear vehicle door based on the gesture relative to the graphic model.

Referring again to FIG. 1, in one embodiment, the vehicle command module 150 verifies the one or more vehicle commands for execution based on sensor data from the vehicle. Pre-determined rules for controlling movable partitions of the vehicle can be defined in a database (e.g., the storage devices 140 and/or located at the network 129, the memory 122) and associated with the graphic model of the vehicle and/or the user. Accordingly, as an illustrative example, the vehicle command module 150 can query the database with the vehicle command (e.g., front vehicle door, open) and rules for restricting and/or confirming the vehicle command can be returned. For example, a rule can be defined as restricting the opening of a vehicle door if it is raining outside. Accordingly, the vehicle command module 150 can receive sensor data from sensors 202 (FIG. 2) to determine if it is raining outside. If yes, the vehicle command module 150 can restrict the execution of the vehicle command. For example, the vehicle command module 150 can generate an alert on the display of the output device notifying the user that it is raining and the user may not open the front vehicle door. In another example, the vehicle command module 150 can update the display of the graphic model with said alert and/or prevent the user from manipulating the front vehicle door of the graphic model (e.g., front vehicle door "snaps back" to a closed state).

In a further embodiment, if the vehicle command is restricted the vehicle command module 150 can provide a suggestion to the user with an alternative manipulation of a movable partition. For example, in the case of rain, the vehicle command module 150 can generate a prompt to be displayed on the display suggesting the user to open the front vehicle window 0.5 inches instead of opening the front vehicle door. In another embodiment, the vehicle command module 150 can confirm the execution of the vehicle command with the user. For example, the vehicle command module 150 can generate an alert on the display of the output device notifying the user that it is raining and provide a prompt asking the user if they wish to open the front vehicle door.

Figure 5A:
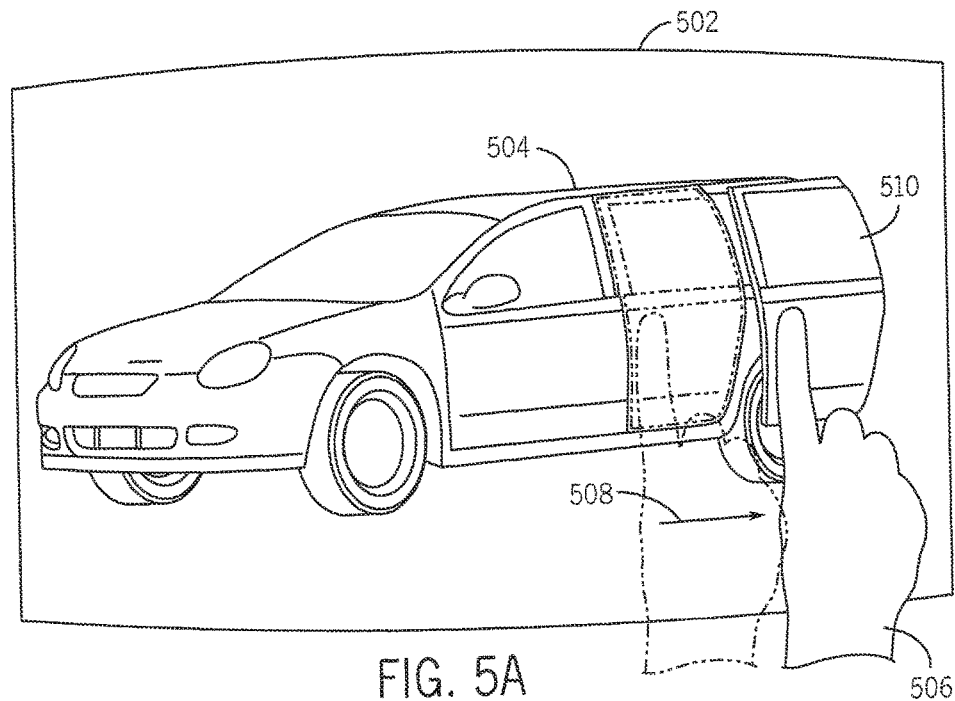
FIG. 5A is a schematic view of a user manipulating a three-dimensional model of a vehicle with gestures relative to the graphic model of the vehicle displayed by an output device according to an exemplary embodiment.
Figure 5B:
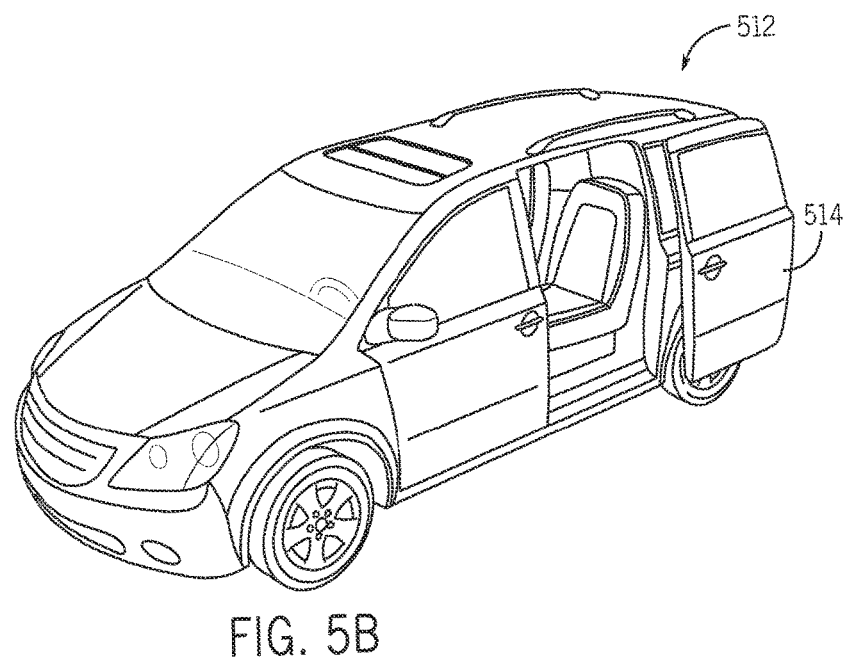
FIG. 5B is a schematic view of the vehicle represented by the three-dimensional model in FIG. 5A after vehicle commands from the gestures shown in FIG. 5A are executed on the vehicle according to an exemplary embodiment.

Referring again to FIG. 1, in one embodiment, the vehicle command module 150 transmits the one or more vehicle commands to the controller 116 for execution at the vehicle 102. As an illustrative example, FIG. 5A is a schematic view of a user manipulating a graphic model (i.e., a three-dimensional model) of the vehicle of FIG. 1 with gestures relative to the graphic model according to an exemplary embodiment. In particular, a display 502 (i.e., of an output device) shows a graphic model 504 of the vehicle 102 of FIG. 1. A hand 506 of a user (not shown) is carrying out a gesture in relation to the graphic model 504 in a direction shown by arrow 508. In this example, the gesture indicates an action to be carried out on a rear vehicle door 510 of the graphic model 504. Accordingly, as discussed above, the vehicle command module 150 identifies a vehicle command as opening the rear vehicle door 510 based on the gesture relative to the graphic model 504. Thus, the vehicle command module 150 transmits the one or more vehicle commands to the controller 116 for execution at the vehicle 102. FIG. 5B is a schematic view of the vehicle 102 of FIG. 1 after the vehicle command from the gestures of FIG. 5A are executed on the vehicle 102.

In another embodiment, the vehicle command module 150 can store the one or more vehicle commands at, for example, the storage devices 140, to be executed at the vehicle 102 at a later time. Thus, the vehicle command module 150 stores the one or more vehicle commands and associates the one or more vehicle commands with the user and the vehicle associated with the graphic model displayed on the output device 132.

In one embodiment, the system as shown in FIG. 1 can include a key FOB 152 that works in conjunction with the output device 132 and the passive entry system 126 of the vehicle 102. The key FOB 152 generally includes a processor 154, a transponder 156, a memory 158, and a transceiver 156. It is understood that the vehicle 102, the output device 132, and the key FOB 152 can each be operably connected for computer communication in various manners. For example, the connection can be facilitated through the network 129, a cellular data network from the output device 132, an in-vehicle network (not shown), among others. Further, it is understood that in some embodiments, the vehicle 102 (e.g., via the communication interface 126), the output device 128 (e.g., via the communication interface 138) and the key FOB 152 (e.g., via the transponder 152 and/or the transceiver 156) can access one another and/or transfer and receive data through the network 158.

In one embodiment, which will be described in further detail herein, the key FOB 152 can be used for authentication with the vehicle 102 (e.g., via the passive entry system 124) to execute a series of vehicle commands stored at the output device 128. Specifically, when the key FOB 152 is within a predetermined range of the vehicle, the passive entry system 126 can authenticate the key FOB 152. Upon authentication, the key FOB 152 can communicate with the output device 132 to transmit the one or more vehicle commands stored at the output device 132 to the controller 116 of the vehicle 102 for execution at the vehicle 102.

In another embodiment, the output device 132 can include similar functionality as the key FOB 152. Accordingly, when the output device 132 is within a predetermined range of the vehicle 102, the passive entry system 126 can authenticate the output device 152. Upon authentication, the output device 132 transmits the one or more vehicle commands stored at the output device 132 to the controller 116 of the vehicle 102 for execution at the vehicle 102. In one embodiment, upon authentication, the vehicle command module 150 verifies the one or more vehicle commands for execution based on sensor data from the vehicle, as discussed above.

Figure 6:
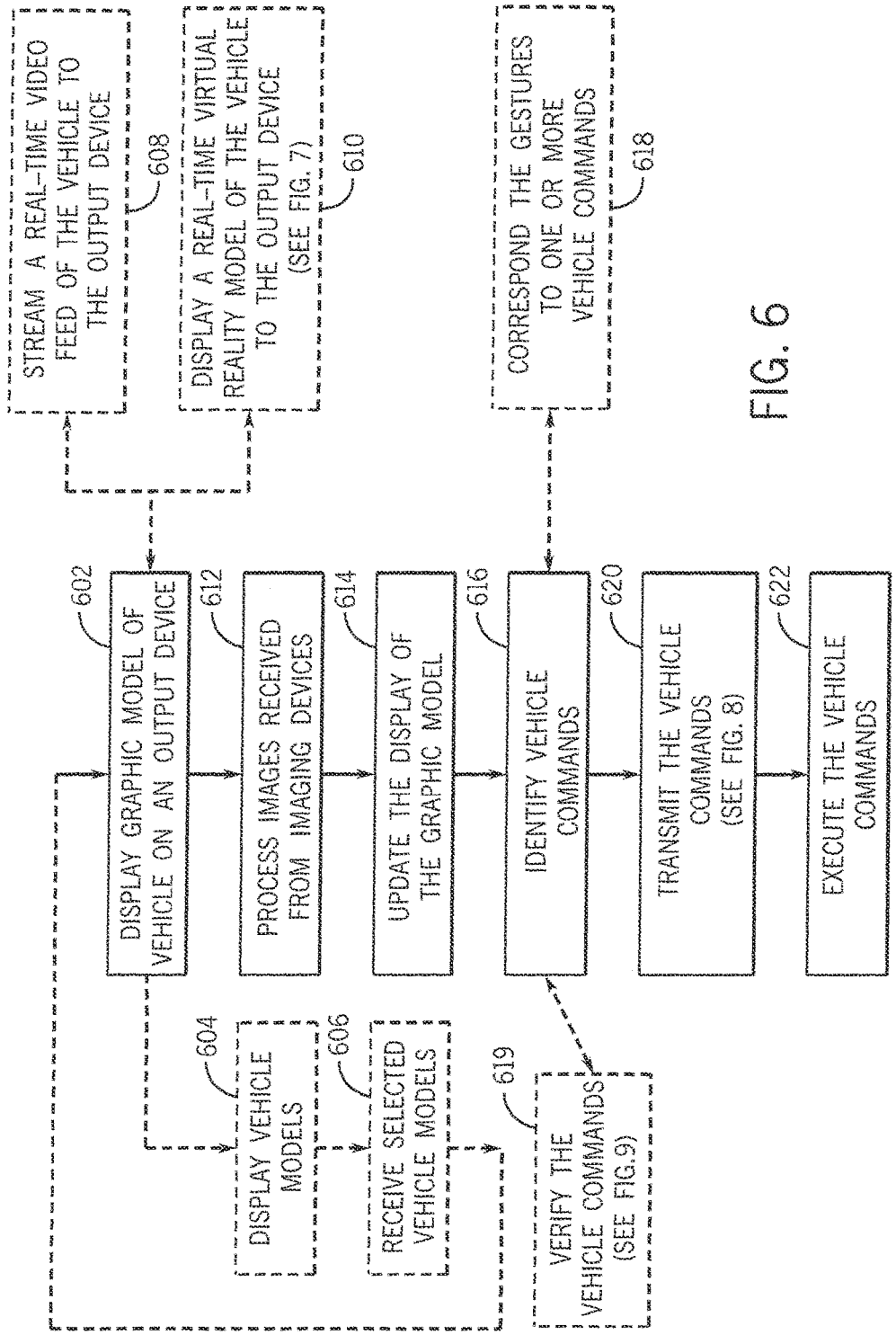
FIG. 6 is a process flow diagram of a method for remote virtual reality control of movable vehicle partitions according to an exemplary embodiment.

Referring now to FIG. 6, a method for remote virtual reality control of movable vehicle partitions according to an exemplary embodiment will be described. FIG. 6 will be described with reference to the components of FIGS. 1-5. At block 602, the method includes displaying a graphic model of at least a portion of a vehicle on an output device. The output device located remotely from the vehicle and the vehicle having one or more movable vehicle partitions.

Referring to FIG. 1, the output device 132 (e.g., a portable device, a head mounted display, a wearable computing device) is located remotely from the vehicle 102 and the vehicle has one or more movable partitions 118. As discussed above, the output device 132 includes a display 135. The display 135 can include a first user interface 136 and a second user interface 138. In one embodiment, the gesture module 143 of the processor 134 generates and/or displays a graphic model of at least a portion of a vehicle 102 on the output device 132 (i.e., on the display 135).

In one embodiment, the graphic model is a three-dimensional virtual reality model of the vehicle. As an illustrative example, FIG. 3A illustrates a user 302 in possession of an output device 304, specifically, a head-mounted display 304. The output device 304 includes a display 305 and a three-dimensional virtual reality model 308 of the vehicle 102 is shown on the display 305. In this embodiment, the graphic model 308 of the vehicle 102 is projected in a space within a user's 302 line of sight, the user 302 in possession of the output device 304.

In one embodiment, the output device 132 can store more than one graphic model of a vehicle (e.g., other than vehicle 102) at the output device 132 (e.g., the storage devices 140). Accordingly, at block 604, the method includes displaying one or more vehicle models on the display 135. For example, the output device 132 includes storage devices 140, which can include a database of one or more graphic models, each graphic model associated with a vehicle and a user. Thus, in one embodiment, the gesture module 148 can display a list of vehicles (e.g., from the storage devices 140) to a user on the display 135. Thus, at block 606, the method can include receiving a user input indicating a selected vehicle from the display 135. The user can select a vehicle from the display 135 (e.g., via gestures and/or touch input with the user interfaces of the displays 135) and the gesture module 148 can receive the selected vehicle and display a graphic model of at least a portion of the vehicle at block 602 selected by the user using stored data associated with the vehicle selected by the user from the storage devices 140.

In another embodiment, the method includes at block 608 displaying a graphic model of a vehicle on an output device can also include streaming a real-time video feed of the vehicle to the output device. The video feed can be received from one or more imaging devices located near the vehicle. For example, the gesture module 148 can display the graphic model on the first interface 136 of the display 135 and the gesture module 148 can stream a real-time video feed of the vehicle 102 to the second interface 138 of the display 135. The gesture module 148 can receive the video feed from imaging devices operably connected for computer communication to the vehicle 102 and/or the output device 132 by a wireless communication technology facilitated, for example, by the network 129. For example, FIG. 2 illustrates the vehicle 102 located remotely from the output device 132. An imaging device 204 is shown that can provide images and/or live video of the vehicle 102 located remotely from the output device 132. The images and/or the live video of the vehicle 102 from the imaging device 204 provides real-time monitoring of the vehicle 102 and the environment surrounding the vehicle 102.

FIG. 4A is a schematic view of an output device including a first user interface displaying a three-dimensional model of a vehicle and a second user interface displaying a real-time video feed of the vehicle according to an exemplary embodiment. More specifically, the display 402 includes a first user interface 404 that displays a graphic model 406 of the vehicle 102. The display 402 also includes a second user interface 408 that displays a real-time video feed 410 of the vehicle 102. The real-time video feed 410 of the vehicle 102 can be received from imaging devices located near the vehicle 102. This allows a user to view a graphic model of the vehicle 102 and a real-time video feed of the vehicle 102 while being located remotely and out of sight from the vehicle 102.

Figure 7:
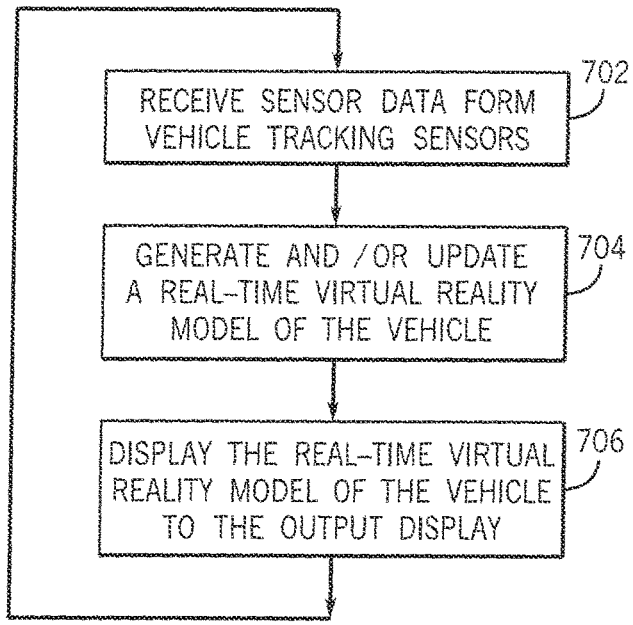
FIG. 7 is a process flow diagram of a method for displaying a real-time virtual reality module of the vehicle to the output device of the method shown in FIG. 6.

In another embodiment, at block 610 the method includes displaying a graphic model of a vehicle on an output device can also include generating a real-time virtual reality model of the vehicle based on sensor data received from the vehicle, wherein the vehicle includes tracking sensors. More specifically and referring to the method shown in FIG. 7, at block 702, the method includes receiving sensor data from vehicle tracking sensors. As discussed above, the vehicle 102 can include sensors, for example, sensors 202 shown in FIG. 2. These sensors can act as tracking devices to provide information on the vehicle 102 and the environment of the vehicle 102. Further, other imaging device, for example, the imaging device 204, can also provide information on the vehicle 102 and the environment of the vehicle 102.

The gesture module 148 can receive said data from the sensors 202 and/or the imaging device 204, and can generate a real-time virtual reality model of the vehicle at block 704. In some embodiments, the gesture module 148 could also use the graphic model of the vehicle (e.g., stored at the storage devices 140) with the information from the sensors 202 and/or the imaging device 204 to generate a real-time virtual reality model of the vehicle. Thus, the graphic model of the vehicle can be augmented using the information from the sensors 202 and/or the imaging device 204 to generate a real-time virtual reality model of the vehicle.

Further, at block 706, the method includes displaying the real-time virtual reality model of the vehicle to the output display. The gesture module 148 can display the real-time virtual reality model of the vehicle 102 on the output device 132 (e.g., on the display 135). In one embodiment, the real-time virtual reality model of the vehicle is displayed simultaneously with the graphic model. For example, FIG. 4B is a schematic view of the output device of FIG. 4A where the second user interface displays a real-time virtual reality model of the vehicle according to an exemplary embodiment. More specifically, the display 414 of FIG. 4B includes a first user interface 416 displaying a three-dimensional virtual reality model 418 of the vehicle 102. The display 414 also includes a second user interface 420 displaying a real-time virtual reality model 422 of the vehicle 102 and the environment surrounding the vehicle 102. The three-dimensional virtual reality model 418 and the real-time virtual reality model 422 are displayed simultaneously. Thus, a user can manipulate the graphic model 418 of the vehicle 102 shown in the first user interface 416 using gestures while viewing the a real-time virtual reality model 422 of the vehicle 102 shown at the second user interface 420. This allows the user to make decisions on opening/closing various movable partitions of the vehicle based on the real-time virtual reality model 422.

Referring again to FIG. 6, at block 612 the method includes processing images received from one or more imaging devices, the images including gestures relative to the graphic model. For example, in FIG. 3A, the output device 304 can include imaging devices (e.g., optical sensors, cameras) to capture images of gestures in relation to the graphic model 308 displayed. For example, the user 302 moves his hand 310 in relation to the graphic model 308 thereby creating a gesture movement. The imaging devices of the output device 304 capture images of the user's hand 310 within the field of view of the imaging devices. The gesture module 148 receives said images and processes the images to determine X, Y and Z coordinates relative to the virtual environment (e.g., the graphic model 308). The gesture module 148 can determine the user's 302 interactions with the graphic model 308 based on the location of the user's hand 310 and the currently displayed graphic model 308. The user's interactions with the graphic model 308 can be based on X. Y and Z coordinates relative to the virtual environment (e.g., coordinates defining the graphic model 308 and components of the graphic model 308). It is understood that the gesture module 148 can also include gesture recognition capabilities to recognize gestures within the images received from the output device 304.

At block 614, the method includes updating the display of the graphic model based on the gestures relative to the graphic model. For example, referring to FIG. 3B the user 312 moves his hand 318 in relation to the graphic model 316 thereby creating a swiping gesture in the direction of arrow 320. The output device 314a shows an updated display of the graphic model 316, shown as graphic model 316a, on the display 315a. The graphic model 316a displays an updated graphic model of the vehicle 102 with the rear vehicle door open based on the gesture made relative to the graphic model 316. It is understood that in some embodiments, block 614 can occur upon processing the images at block 612 and/or upon identifying the vehicle commands at block 616.

At block 616, the method includes identifying one or more vehicle commands based on the gestures relative to the graphic model. The vehicle commands defining change (e.g., a controlled change) of the one or more movable vehicle partitions. As an illustrative example, the vehicle command module 150 can use characteristics of the gesture, for example, a hand shape, a position of the hand (e.g., X, Y and Z coordinates relative to the graphic model), a movement and direction of movement of the hand relative to the graphic model, to identify the gesture and the component of the graphic model associated with the gesture (e.g., a movable partition).

In one embodiment, at block 618, the method includes corresponding the gestures to one or more vehicle commands. The vehicle command module 150 can, in one embodiment, query a database (e.g., the storage devices 140 and/or located at the network 129, the memory 122) with the characteristics described above and the identified component of the graphic model to correspond an associated vehicle command with the gesture. For example, referring to FIG. 3B, the shape of the hand 318, the position of the hand 318 and the motion and direction 320 of the hand 318 with respect to coordinates of the graphic model 316 can be used to determine a vehicle command. In this example, the gesture indicates a sweeping motion across the rear vehicle door shown in the graphic model 316. Accordingly, the vehicle command module 150 identifies the vehicle command as opening the rear vehicle door based on the gesture relative to the graphic model.

In another embodiment, the vehicle command module 150 can store the one or more vehicle commands at, for example, the storage devices 140, to be executed at the vehicle 102 at a later time (described in more detail at block 620). Thus, the vehicle command module 150 stores the one or more vehicle commands and associates the one or more vehicle commands with the user and the vehicle associated with the graphic model displayed on the output device 132.

Figure 9:
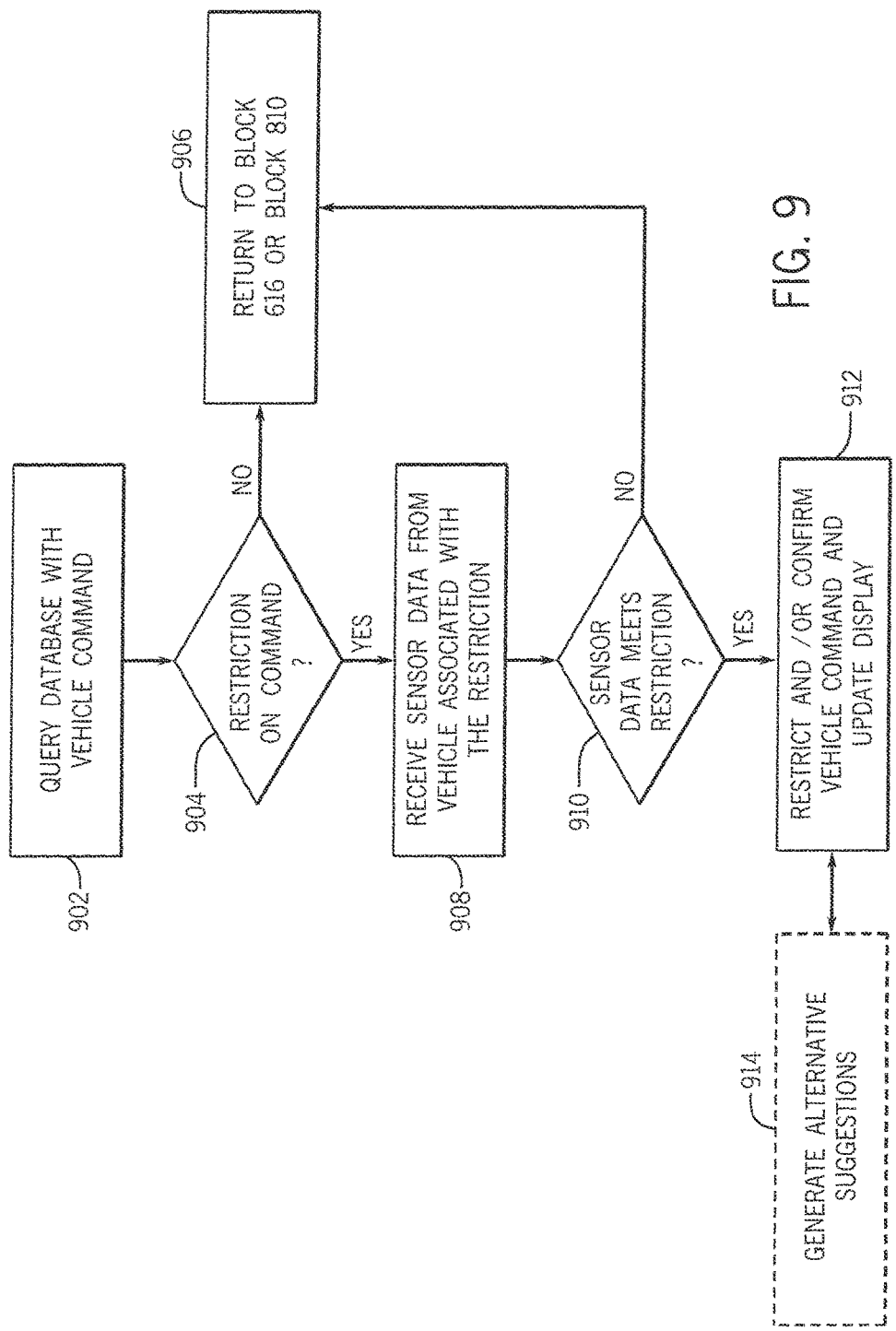
FIG. 9 is a process flow diagram of a method for verifying one or more vehicle commands of the method shown in FIGS. 6 and 8.

In a further embodiment, at block 619, the method includes verifying the one or more vehicle commands for executed based on sensor data from the vehicle. Referring now to FIG. 9, a method is shown for verifying one or more vehicle commands. At black 902, the method includes querying a database with the vehicle command. For example, a database (e.g., the storage devices 140, a remote database via network 129) can include a pre-defined rule set for restricting and/or confirming the vehicle command. Table 1, below, illustrates an exemplary data set from the database. It is understood that table 1 can include other parameters and be organized in various ways for different embodiments.

TABLE 1

| Row | Movable Partition | Action Amount | Action Requirement | Restriction Threshold | Restriction | Suggestion |
|---|---|---|---|---|---|---|
| 1 | front vehicle door | open | 90 degrees | restrict | medium rain | open front vehicle window 0.25 inches |
| 2 | front vehicle door | open | 90 degrees | restrict | object detected within 2 feet | |
| 3 | rear vehicle door window | open | 1 inch | confirm | light rain | |
| 4 | sunroof | close | | restrict | object detected within 1 foot | |

As an illustrative example, the vehicle control module 150 can query the database with a vehicle command including a movable partition equal to front vehicle door and an action of open 90 degrees. Referring to table 1, the database returns rows 1 and 2 to the vehicle control module 150. Accordingly, at block 904, it is determined if there is a restriction on the vehicle command. If NO, at block 906, the method returns to block 616. If YES, the method proceeds to block 618. Referring again the illustrative example, there is a restriction requirement for rows 1 and 2.

Accordingly, at block 908, the method includes receiving sensor data from the vehicle associated with the restriction. For example, the vehicle control module 150 can receive sensor data from sensors 202 (FIG. 2). Referring again to the illustrative example, the restriction requirement for row 1 is associated with rain and the restriction requirement for row 2 is associated with object detection. Accordingly, the vehicle control module 150 can receive sensor data from sensor 202g to determine an amount of rain and the vehicle control module 150 can receive sensor data from at least sensor 202c to determine the presence of any objects in proximity of the vehicle 102.

Accordingly, at block 910, it is determined if the sensor data meets the restriction. More specifically, and referring again to Table 1, it is determined if the sensor data meets the restriction threshold. Referring again to the illustrative example, the vehicle control module 150 can compare the amount of rain detected by the sensor 202g and determine the amount of rain is equal to a medium rain. Accordingly, at block 912, the method includes restricting the vehicle command. The vehicle control module 150 can restrict the vehicle command by generate an alert on the display of the output device notifying the user that it is raining and the user may not open the front vehicle door. In another example, the vehicle command module 150 can update the display of the graphic model with said alert and/or prevent the user from manipulating the front vehicle door of the graphic model (e.g., front vehicle door "snaps back" to a closed state).

In a further embodiment, at block 914, the method can include generating an alternative suggestion. For example, the vehicle command module 150 can generate a prompt and update the display of the output device suggesting to open the front vehicle window 0.25 inches. In another embodiment, the vehicle command is confirmed, rather than restricted. For example, the vehicle command module 150 can generate an alert on the display of the output device notifying the user that it is raining and provide a prompt asking the user if they wish to still open the front vehicle door.

Figure 8:
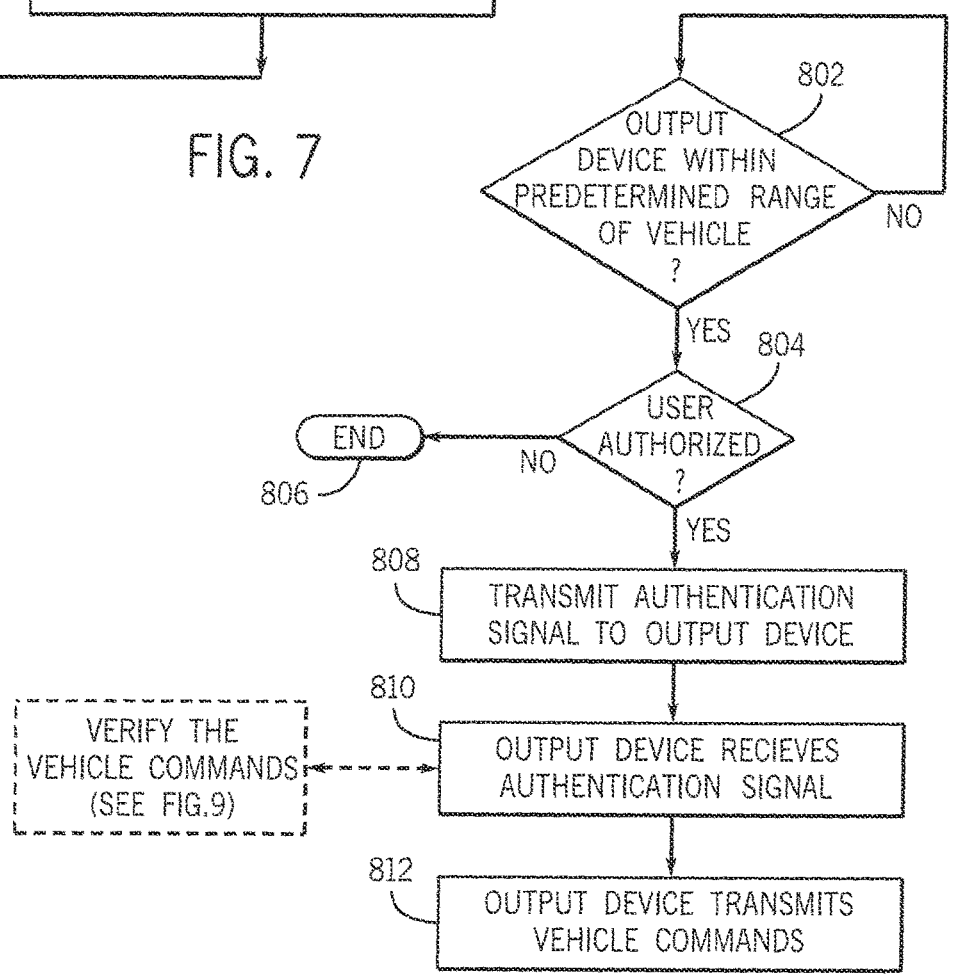
FIG. 8 is a process flow diagram of a method for transmitting vehicle commands of the method shown in FIG. 6.

Referring again to block 620, the method includes transmitting the vehicle commands to the vehicle. As discussed above, in one embodiment the system shown in FIG. 1 can include a key FOB 152 that works in conjunction with the output device 132 and the passive entry system 126 of the vehicle 102. This operation will be described in more detail with reference to the method of FIG. 8. At block 802, it is determined if the output device 132 is within a predetermined range of the vehicle. In another embodiment, it is determine if the key FOB 132 is within a predetermined range of the vehicle. This determination can be made by the passive entry system 126.

If yes, at block 804, it is determined if the user is authorized to operate the vehicle 102. If no, the method ends at 806. If yes, at block 808, the method includes transmitting an authentication signal to the output device. More specifically, the method at block 810 includes receiving at the output device, an authentication signal from the vehicle when the output device is located within a predetermined range of the vehicle. As mentioned above, in some embodiments, the method includes transmitting an authentication signal to the key FOB 152. In this embodiment, the key FOB 152 can communicate the authentication to the output device 132. In one embodiment, upon receiving the authentication signal, the method can include at block 811, verifying the vehicle commands for execution based on sensor data from the vehicle (See FIG. 9 discussed above).

At block 812, the method includes transmitting the vehicle commands from the output device to the vehicle for execution. The vehicle command module 150 can retrieve the saved vehicle commands at the storage device 140 and transmit the vehicle commands to the vehicle 102 (e.g., the control 116). In one embodiment, the vehicle commands are stored in sequence based on the gestures made in relation to the graphic model. Accordingly, the controller 116 can execute the vehicle commands in sequence.

Referring again to FIG. 6, at block 622, the method includes executing the vehicle commands at the vehicle. In particular, the vehicle command module 150 transmits the one or more vehicle commands to the controller 116 for execution at the vehicle 102. As an illustrative example, FIG. 5A is a schematic view of a user manipulating a graphic model (i.e., a three-dimensional model) of the vehicle 102 of FIG. 1 with gestures relative to the graphic model according to an exemplary embodiment. In particular, a display 502 (i.e., of an output device) shows a graphic model 504 of the vehicle 102 of FIG. 1. A hand 506 of a user (not shown) is carrying out a gesture in relation to the graphic model 504 in a direction shown by arrow 508, in this example, the gesture indicates an action to be carried out on a rear vehicle door 510 of the graphic model 504. Accordingly, as discussed above, the vehicle command module 150 identifies a vehicle command as opening the rear vehicle door 510 based on the gesture relative to the graphic model 504. Thus, the vehicle command module 150 transmits the one or more vehicle commands to the controller 116 for execution at the vehicle 102. FIG. 5B is a schematic view of the vehicle 102 of FIG. 1 after the vehicle command from the gestures of FIG. 5A are executed on the vehicle 102. Accordingly, the methods and systems discussed herein use virtual reality to provide remote vehicle control of movable vehicle partitions in a fully automatic and unattended manner.

The embodiments discussed herein may also be described and implemented in the context of non-transitory computer-readable storage medium storing computer-executable instructions. Non-transitory computer-readable storage media includes computer storage media and communication media. For example, flash memory drives, digital versatile discs (DVDs), compact discs (CDs), floppy disks, and tape cassettes. Non-transitory computer-readable storage media may include volatile and nonvolatile, removable and non-removable media implemented in any method or technology for storage of information such as computer readable instructions, data structures, modules or other data. Non-transitory computer readable storage media excludes transitory and propagated data signals.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for remote virtual reality control of movable vehicle partitions, comprising:
displaying a three-dimensional virtual reality model of at least a portion of a vehicle on a display of an output device, the output device located remotely from the vehicle, the vehicle having one or more movable vehicle partitions;
receiving images that capture gestures made in relation to the three-dimensional virtual reality model displayed on the output device from one or more imaging devices of the output device;
identifying one or more vehicle commands in a sequence based on the images that capture the gestures made in relation to the three-dimensional virtual reality model, the one or more vehicle commands defining control of the one or more movable vehicle partitions, and storing the one or more vehicle commands in the sequence in a memory of the output device;
receiving real-time video feed from one or more imaging devices located adjacent to the vehicle;
wherein the display of the output device includes a first user interface and a second user interface, displaying the three-dimensional virtual reality model on the first interface and streaming the real-time video feed of the vehicle to the second interface;
and upon determining the output device is located within a predetermined range of the vehicle based upon receiving an authentication signal at the output device from the vehicle when the output device is located within the predetermined range, transmitting the one or more vehicle commands in the sequence from the memory of the output device to the vehicle and executing the one or more vehicle commands at the vehicle.

2. The computer-implemented method of claim 1, comprising updating the display of the three-dimensional virtual reality model based on the gestures made in relation to the three-dimensional virtual reality model.

3. The computer-implemented method of claim 1, comprising streaming a real-time video feed of the vehicle to the output device, the video feed received from one or more imaging devices located next to the vehicle.

4. The computer-implemented method of claim 3, comprising streaming a real-time audio feed to the output device corresponding to the real-time video feed of the vehicle.

5. The computer-implemented method of claim 1, comprising generating a real-time virtual reality model of the vehicle based on sensor data received from the vehicle and displaying the real-time virtual reality model of the vehicle on the output device simultaneously with the three-dimensional virtual reality model.

6. A system for remote virtual reality control of movable vehicle partitions, comprising:
a vehicle having a controller, one or more movable vehicle partitions, and a passive entry system, the controller operably connected for computer communication to an output device;
the output device, located remotely from the vehicle, the output device having a display, wherein the output device displays a three-dimensional virtual reality model of at least a portion of the vehicle on the display, wherein the output device includes a processor and wherein the processor includes;
a gesture module that processes images received from one or more imaging devices, the images including gestures made to manipulate the three-dimensional virtual reality model displayed on the output device;
and a vehicle command module that identifies a plurality of vehicle commands and a sequence of the plurality of vehicle commands based on the gestures made to manipulate the three-dimensional virtual reality model and stores the plurality of vehicle commands and the sequence of the plurality of vehicle commands in a memory of the output device, wherein the plurality of vehicle commands define control of the one or more movable vehicle partitions according to the sequence,
wherein upon the passive entry system authenticating the output device when the passive entry system determines the output device is within a predetermined range of the vehicle, the vehicle command module transmits the plurality of vehicle commands and the sequence of the plurality of vehicle commands from the memory of the output device to the controller for execution at the vehicle according to the sequence;
wherein the display of the output device includes a first user interface and a second user interface; and
wherein the gesture module displays the three-dimensional virtual reality model on the first interface and the gesture module streams a real-time video feed of the vehicle to the second interface, the video feed received from one or more imaging devices located next to the vehicle.

7. The system of claim 6, wherein the gesture module generates a three-dimensional real-time virtual reality model of the vehicle based on sensor data received from the vehicle and displays the three-dimensional real-time virtual reality model of the vehicle on the second interface.

8. The system of claim 6, wherein the output device includes a database of one or more three-dimensional virtual reality models, each model associated with a vehicle and a user associated with the vehicle.

9. The system of claim 8, wherein the vehicle command module stores the plurality of vehicle commands in the database associated with the user and the vehicle associated with the three-dimensional virtual reality model displayed on the output device.

10. The system of claim 6, wherein the output device updates the display of the three-dimensional virtual reality model based on the gestures made to manipulate the three-dimensional virtual reality model.

11. A non-transitory computer-readable storage medium storing instructions that, when executed by a computer, causes the computer to perform a method comprising:
  displaying a three-dimensional virtual reality model of at least a portion of a vehicle on an output device, the output device located remotely from the vehicle, the vehicle having one or more movable vehicle partitions;
  generating a real-time virtual reality model of the vehicle based on data received at the output device from vehicle sensors of the vehicle;
  displaying the real-time virtual reality model of the vehicle on a display of the output device simultaneously with the three-dimensional virtual reality model;
  receiving images from one or more imaging devices, the images including gestures made relative to the three-dimensional virtual reality model;
  identifying a plurality of one or more vehicle commands in a sequence based on the images including the gestures made to interact with the three-dimensional virtual reality model, the one or more vehicle commands defining control of the one or more movable vehicle partitions;
  receiving real-time video feed from one or more imaging devices located adjacent to the vehicle;
  wherein the display of the output device includes a first user interface and a second user interface, displaying the three-dimensional virtual reality model on the first interface and streaming the real-time video feed of the vehicle to the second interface; and
  upon determining the output device is located within a predetermined range of the vehicle, verifying the one or more vehicle commands for execution based on sensor data received from the vehicle and predetermined-rules for controlling movable partitions of the vehicle, and transmitting the one or more vehicle commands that have been verified to the vehicle for execution.

12. The computer-implemented method of claim 11, further comprising updating the display of the three-dimensional virtual reality model based on the gestures made to interact with the three-dimensional virtual reality model.

* * * * *